(No Model.) 2 Sheets—Sheet 1.
A. W. PAULL.
LANTERN.
No. 433,362. Patented July 29, 1890.
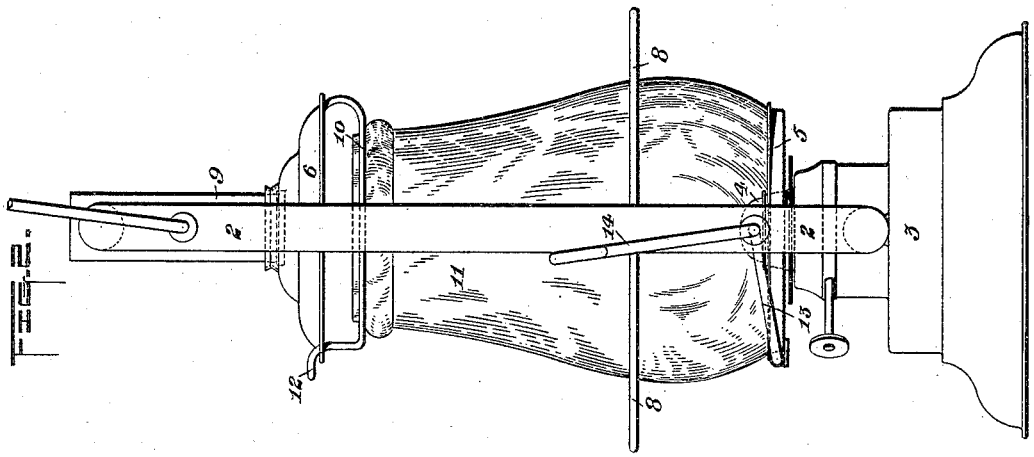
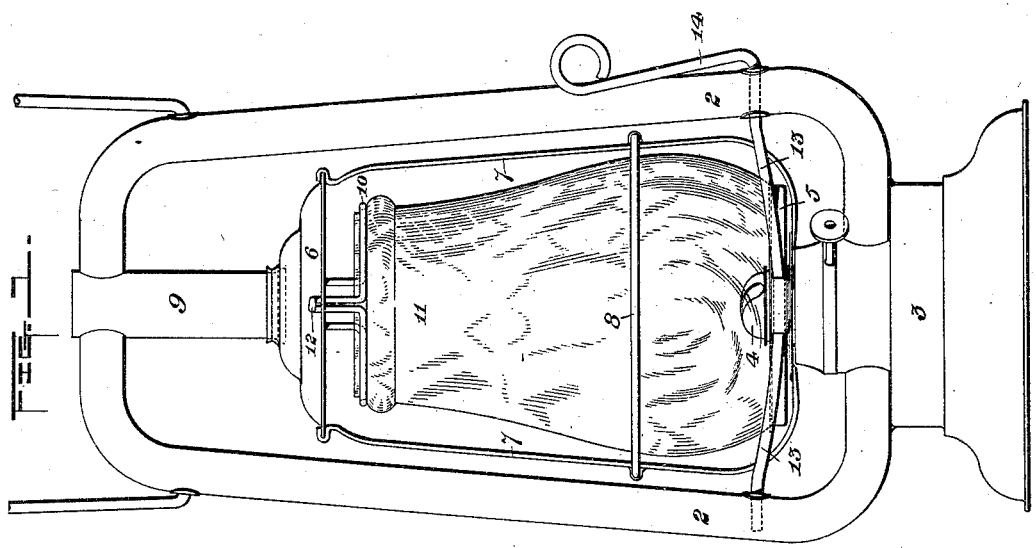
WITNESSES:
INVENTOR.
Archibald W. Paull
by W. Bakewell & Sons
his Attorneys (No Model.)
2 Sheets—Sheet 2.
A. W. PAULL.
LANTERN.
No. 433,362. Patented July 29, 1890.
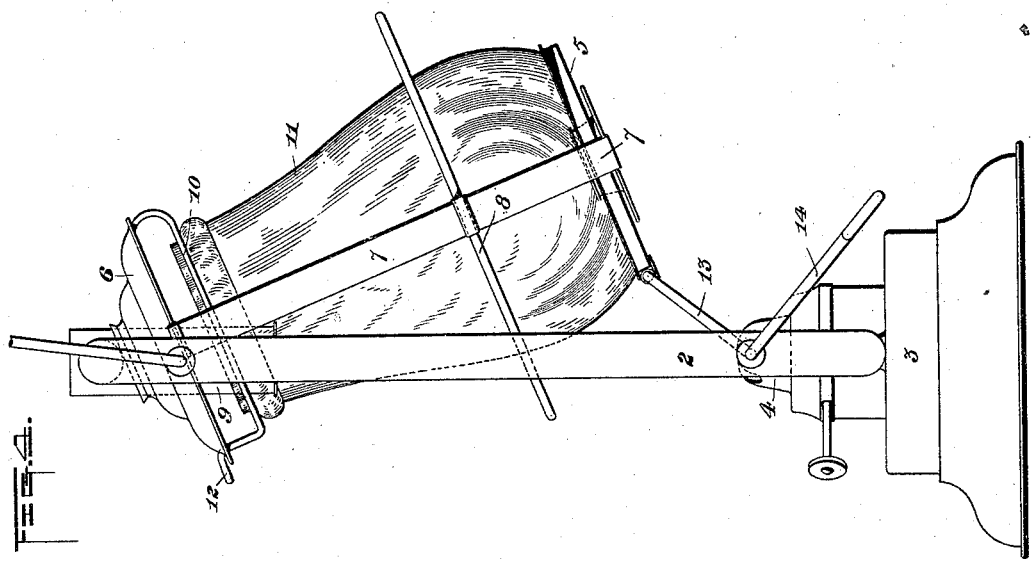
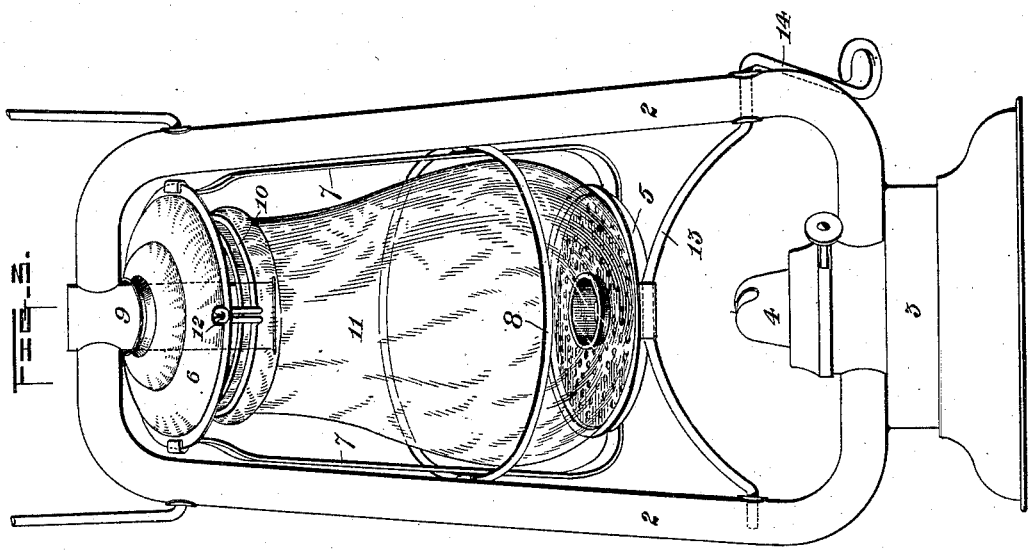
WITNESSES.
INVENTOR.
Archibald W. Paull
by W. Bakewell & Sons
his Attorneys

UNITED STATES PATENT OFFICE.

ARCHIBALD W. PAULL, OF WHEELING, WEST VIRGINIA, ASSIGNOR TO THE NAIL CITY LANTERN COMPANY, OF WEST VIRGINIA, AND THE BELLAIRE STAMPING COMPANY, OF OHIO.

LANTERN.

SPECIFICATION forming part of Letters Patent No. 433,362, dated July 29, 1890.

Application filed March 23, 1888. Serial No. 268,280. (No model.)

*To all whom it may concern:*

Be it known that I, ARCHIBALD W. PAULL, of Wheeling, in the county of Ohio and State of West Virginia, have invented a new and useful Improvement in Lanterns; and I do hereby declare the following to be a full, clear, and exact description thereof, reference being had to the accompanying drawings, forming part of this specification, in which—

Figure 1 is a front view of my improved lantern. Fig. 2 is a side view of the same. Fig. 3 is a front view of the lantern, showing the globe in its raised position. Fig. 4 is a side view of the same.

Like symbols of reference indicate like parts in each figure.

My invention relates to an improvement in lanterns; and it consists in devices for shifting the globe so as to afford ready access to the burner, as is hereinafter more fully described.

In the drawings, 2 represents the air-tubes and 3 the base or well. Fitting in the mouth of the oil-well is the burner 4, on which rests the perforated base-plate 5, which is connected with the upper or top plate 6 by the side rods or wire frame 7, which rods are connected by the circular cross wire or rod 8. Extending through an opening in the top plate 6 is the vertical tube 9, which is attached to and communicates with the upper portion of the side air-tubes 2. The opening in the plate 6 is sufficiently large to allow the plate to slide easily on the tube 9. Attached to the plate 6 is the circular spring 10, which engages with the top of the globe 11, and is provided with a thumb-piece 12, by means of which the spring may be raised to permit of the passage of the top of the globe to a point directly under the spring after the lower portion of the globe has been seated on the lower plate 5. This spring serves to retain the globe 11 in its position between the two plates 5 and 6. Journaled in the air-tubes 2, or on or near the base of the lantern, is a rod 13, which is bent into the form of the segment of a circle and is pivotally journaled to or connected with the perforated base-plate 5. Outside of one of the air-tubes the rod 13 is bent upward, forming a lever 14, the upper end of which lever is bent slightly inward, so as to engage the outer face of the air-tube and form a spring-catch. The purpose of the lever 14 and rod 13 is to elevate the lower plate 5, upper plate 6, and the globe, and then to carry the same to one side, so as to permit a free access to the burner.

The operation of this device is as follows: When it is desired to raise the globe from the burner, the lever-arm 14 is pressed away from the air-tube and down toward the base of the lantern, and as the lever-arm is an extension of the curved rod 13 and is bent at right angles thereto the effect of this is first to raise the globe and upper and lower plates, the upper plate sliding on the air-tube, and then when the rod 13 has reached the limit of its upward motion to move the lower plate 5 and the globe laterally away from the burner, the opening in the plate 6 being sufficiently large to permit of a slight inclination of the plate, while the spring 10 permits of the farther movement of the lower plate and globe. By reversing the movement of the lever-arm 14 the globe and lower plate 5 are again brought down over the burner, while the upper portion of the lever-arm, passing the air-tube and springing over the same serves to retain the globe and plate in their lowered and normal position. By these means the globe is not only raised from the burner, but is at the same time thrown to one side out of the way, as is clearly shown in Figs. 3 and 4.

In the device herein shown and described, the canopy slides and rocks on the central air-tube, and a lever, irrespective of construction, is pivoted to the lantern-frame to raise the globe-frame and move it laterally.

In the device shown and described in the application Serial No. 337,319, the canopy has a sliding motion on the central air-tube, and the air-tube is pivoted on the side air-tubes, so as to have a rocking motion thereon, by which the globe-frame may be moved laterally. In the last-named device, further, the lever which movably connects the globe-frame to the lower part of the lantern may or may not have a handle, and when the handle is employed it interlocks with the air-tubes to retain the globe-frame in position.

In the device shown and described in the application Serial No. 337,688, the canopy has a sliding but no rocking motion on a central air-tube, and the globe-frame is pivotally connected with the canopy to swing laterally from such canopy. The lever is connected to the upper portion of the globe-frame and the lower portion of the globe-frame swings free.

I am aware that lantern-globes pivoted and adapted to swing laterally are not new, and I do not desire to claim the same, broadly.

I claim—

1. In a tubular lantern, the combination, with the central air-tube, of a plate loosely mounted and adapted to slide and rock thereon, and having depending arms provided at the base with a globe-supporting plate, substantially as and for the purposes described.

2. In a tubular lantern, the combination of the side tubes, a central tube, a laterally and vertically movable globe-supporting frame, comprising a plate mounted on the central tube and vertically movable thereon, depending arms, and a globe rest or plate, and a lever pivoted to the lantern-frame and connected with the globe-supporting frame and adapted to raise the globe and move it away from the burner laterally relatively to the plane of the air-tubes, substantially as and for the purposes described.

In testimony whereof I have hereunto set my hand this 16th day of March, A. D. 1888.

ARCHIBALD W. PAULL.

Witnesses:
W. B. CORWIN,
JNO. K. SMITH.